(12) United States Patent
Jia et al.

(10) Patent No.: US 9,186,745 B2
(45) Date of Patent: Nov. 17, 2015

(54) DOUBLE WIRE GMAW WELDING TORCH ASSEMBLY AND PROCESS

(75) Inventors: Shijun Jia, Pudong (CN); Douglas Steyer, Orchard Park, NY (US); Xiangui Cao, Shanghai (CN); Mohan Chobe, Pimplegurav Pimpri (IN); Tianming He, Haizhu (CN)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 857 days.

(21) Appl. No.: 13/131,659

(22) PCT Filed: Dec. 16, 2009

(86) PCT No.: PCT/US2009/068150
§ 371 (c)(1),
(2), (4) Date: Sep. 28, 2011

(87) PCT Pub. No.: WO2010/080411
PCT Pub. Date: Jul. 15, 2010

(65) Prior Publication Data
US 2012/0055911 A1    Mar. 8, 2012

(30) Foreign Application Priority Data
Dec. 19, 2008   (IN) .............. 2879/DEL/2008

(51) Int. Cl.
*B23K 9/28* (2006.01)
*B23K 9/173* (2006.01)
*B23K 9/29* (2006.01)

(52) U.S. Cl.
CPC ............... *B23K 9/1735* (2013.01); *B23K 9/295* (2013.01)

(58) Field of Classification Search
CPC .......................................... B23K 9/16–9/1735
USPC ........................ 219/137.2–137.44, 138–144
See application file for complete search history.

(56) References Cited

U.S. PATENT DOCUMENTS

| | | | | |
|---|---|---|---|---|
| 2,779,364 A | * | 1/1957 | Farmer | 100/233 |
| 3,200,235 A | * | 8/1965 | Faust | 219/127 |
| 3,278,720 A | | 10/1966 | Dixon | |
| 3,349,213 A | * | 10/1967 | Gorman | 219/60 R |
| 3,549,855 A | * | 12/1970 | Lawrence | 219/75 |
| 5,155,330 A | | 10/1992 | Fratiello et al. | |
| 5,798,493 A | * | 8/1998 | Heller, Sr. | 219/75 |
| 6,005,215 A | * | 12/1999 | Boyd et al. | 219/76.14 |
| 6,172,333 B1 | | 1/2001 | Stava | |
| 6,683,279 B1 | | 1/2004 | Moerke | |
| 2006/0243704 A1 | | 11/2006 | Matz et al. | |
| 2007/0145028 A1 | | 6/2007 | Artelsmair | |

FOREIGN PATENT DOCUMENTS

EP   1 294 522 B1   9/2007

* cited by examiner

*Primary Examiner* — Sang Y Paik
(74) *Attorney, Agent, or Firm* — Ralph J. Mancini

(57) ABSTRACT

A double wire GMAW welding apparatus having a wire spacing adjustable torch assembly is disclosed. The double wire torch assembly has a wire spacing adjusting mechanism, by means of wire spacing adjustment the torch assembly can be used for a non-synchronized metal transfer weld process. The wires remain parallel before, during, after wire spacing adjustment.

13 Claims, 5 Drawing Sheets

DOUBLE WIRE GMAW WELDING TORCH ASSEMBLY AND PROCESS

RELATED APPLICATIONS

This application claims the benefit of National Stage International Patent Application No. PCT/US09/68150, filed on Dec. 16, 2009 which claims priority to Indian Patent Application No. 2879/DEL/2008 filed on Dec. 19, 2008, incorporated herein by reference.

TECHNICAL FIELD OF THE INVENTION

The present invention relates to gas metal arc welding (GMAW), and more particularly relates to a torch assembly for a GMAW welding apparatus employing two electrode wires for delivering metal in a single weld pool. The present invention further relates a GMAW welding process using such a welding apparatus.

BACKGROUND OF THE INVENTION

GMAW welding is a common industrial weld process because of its versatility, weld travel speed, and the relative ease of adapting the process to robotic automation. In single wire GMAW processes, a single continuous and consumable electrode wire and a shielding gas are fed through a welding torch.

To obtain higher welding speed, a double wire GMAW welding apparatus and process has also been developed, which employs two electrically isolated wire electrodes for combining two welding arcs in one weld pool. In such a double wire GMAW process, a welding torch is provided with two wire electrodes. Compared with the conventional single wire welding processes, the double wire GMAW process can obtain a substantial increase in welding speed. Therefore, the double wire GMAW process has been increasingly employed in industrial welding applications that require high productivity, performance, and deposit rate, such as tank construction, boiler engineering, vehicle manufacturing, automotive and railway constructions and shipbuilding, etc. Such a double wire GMAW welding is known from U.S. Pat. Nos. 5,155,330, 6,683,279, US Patent Publication Nos. 2006/0243704, 2007/0145028, and EP Patent No. 1294522.

The GMAW weld quality depends on many factors, conditions, and considerations, such as wire feeding, shielding gases, base materials and thickness of work pieces to be welded and metal transfer modes. Also, the dynamics of welding parameters are complex, and the establishment of a stable arc depends on a series of conditions involving welding current, power supply voltage, wire feed speed, torch traveling speed, distance between a contact tip and a work piece (hereinafter referred to as tip-to-work distance), and torch angle, in order to achieve a desired weld. The situation becomes more complex when two electrode wires are utilized in the double wire GMAW welding apparatus and process.

In use, because electric arc sizes vary in length and width with changes in the above parameters for variable welding requirements, these two electric arcs might get close to a point of interfering with each other as a result of the electromagnetic arc blow effect, which dramatically affects the process stability and spatter degree. This can make the process technically infeasible. It is therefore desirable to adjust the wire spacing with regard to a particular weld condition, in order to minimize the wire interference.

A synchronized pulsed welding method has recently been developed, which uses a pulsing current to melt the electrode wire and allow one small molten droplet to fall with each pulse. The pulse provides a stable arc and no spatter, since no short-circuit takes place. However, the necessity of utilizing complex arc pulsing conditions may limit the broad application of the double wire synchronized pulsed welding process, due to the extra requirement on the power sources capabilities. For example, it requires a special power source capable of providing current pulses with a frequency within a certain range, such as 30-400 pulses per second. Moreover, a controller is needed to synchronize the two arcs. As a result, there exists a need for a non-synchronized double wire welding process with the same capabilities as the synchronized pulsed-spray welding, such as the stable weld process, but without spatter.

U.S. Pat. No. 5,155,330 discloses a double wire GMAW welding method and apparatus. The method involves two welding electrodes to be connected to a single power source for a welding process. The apparatus comprises an interchangeable elongated, electrically conductive welding wire guide member having a cylindrical body including a first and second wire, which are spaced from each other with the centerline distance between 4.7-9.4 mm by changing the angles of the contact tips.

US Patent Publication No. 2006/0243704 discloses a method and apparatus of welding using at least two consumable electrodes. When two wire electrodes are used, the first one is larger in diameter compared to the second and a common weld pool is produced. A changeable distance between 3-12 mm is disclosed, and this distance range is obtained by means of changing the tip-to-work distance of the two nonparallel electrodes. It is disadvantageous during the welding process in that the tip-to-work distance is an important variable, and that the tip-to-work distance is usually required to be kept within an optimal range for an eligible weld.

Although the above-mentioned double wire GMAW welding processes have been developed, there remains room for further improvement in the art.

SUMMARY OF THE INVENTION

Among a wide variety of the parameters studied, the wire spacing between the two electrodes has proven to be one of the most important factors influencing the performance and the weld quality. For a given set of parameters required to perform a weld, closer inter-wire distances produce arc interference and farther distances result in two separate molten pools being formed. Moreover, arc interactions between two wires can be reduced by changing the inter-wire distance. Therefore, the welding process stability can be improved and spatter can be avoided through optimizing the wire spacing.

Therefore, it is an object of the present invention to provide a double wire GMAW welding apparatus and process to eliminate arc interference and overcome the above mentioned drawbacks in the prior art.

It is a further object of the present invention to provide a wire spacing changeable torch assembly meeting different weld requirements and suitable for different weld conditions.

It is another object of the present invention to provide a wire spacing changeable torch able to be used for a non-synchronized metal transfer weld process, achieving a stable arc and avoiding spatter.

The above one or more objects can be achieved by the double wire GMAW welding apparatus having the wire spacing adjustable torch assembly in accordance with the present invention. The double wire torch assembly of the present invention has a wire spacing adjusting mechanism and by adjusting the spacing, the torch assembly can be used for a non-synchronized metal transfer weld process.

BRIEF DESCRIPTION OF THE DRAWINGS

The details of one or more embodiments of the present invention are set forth in the accompanying drawings and the description below. Other features, objects, and advantages of the invention will be apparent from the detailed description and the drawings, in which.

DETAILED DESCRIPTION OF THE INVENTION

Figure 1:
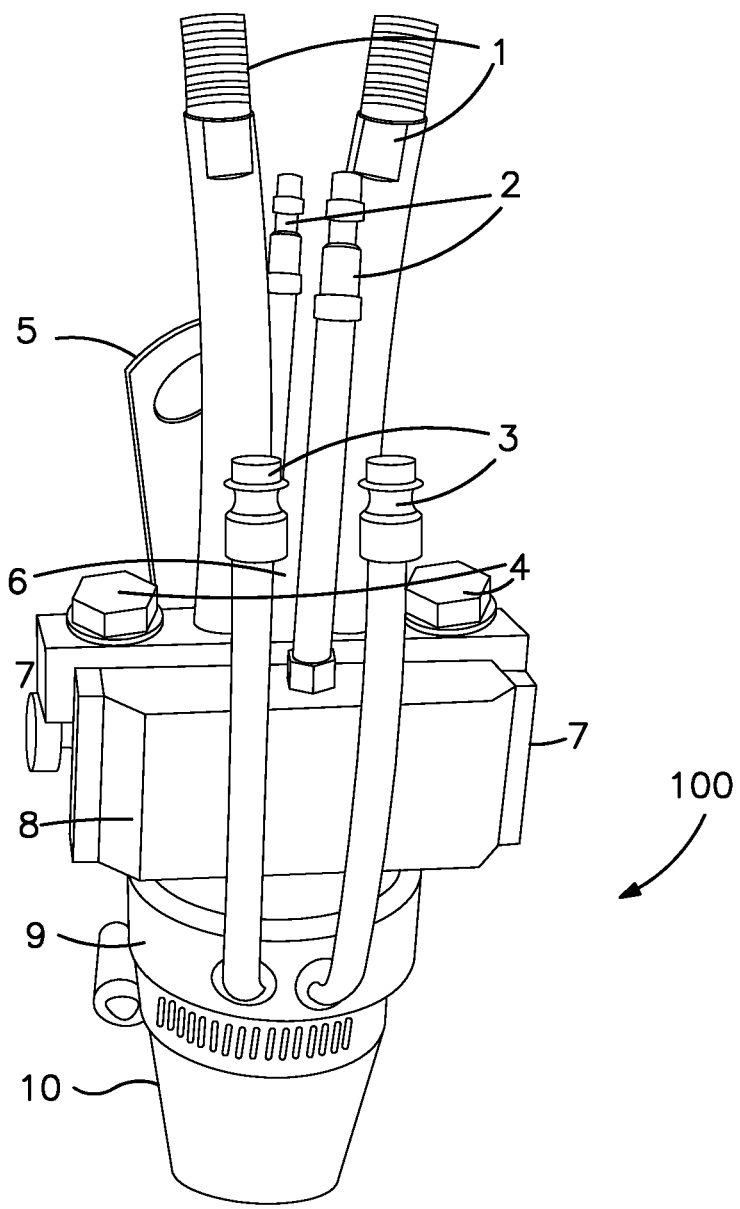
FIG. 1 is a perspective view of the double wire torch assembly with adjustable wire distance according to the present invention.

Referring now to the drawings wherein the showings are for the purpose of illustrating preferred embodiments of the present invention only and not for the purpose of limiting the invention. More particularly referring to FIGS. 1 and 2, it can be seen that a double wire torch assembly of the double wire GMAW welding apparatus in accordance with the present invention is designated generally by the numeral 100.

Figure 2:
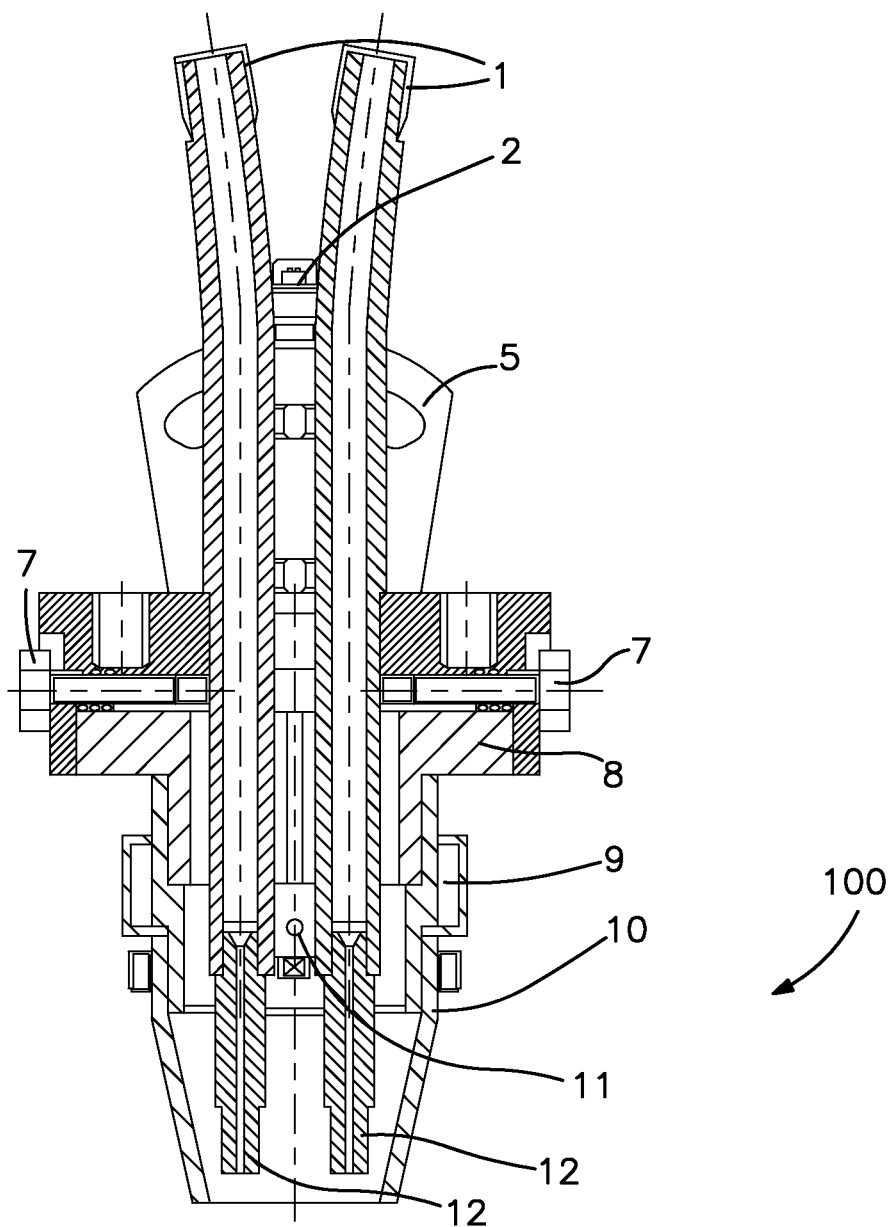
FIG. 2 is a schematic view of the torch assembly shown in FIG. 1.

The double wire torch assembly 100 shown in FIGS. 1 and 2 comprises two separate, parallel electrode wire conduits 1, two power cable connectors 4, a shielding gas nozzle 10, and two contact tips 12. Although not shown in FIGS. 1 and 2, the double wire GMAW welding apparatus is also provided with two wire feed units for independently supplying the two separate electrode wires to the torch assembly and driving the two wires through the two wire conduits 1 and on to the respective contact tips 12.

In one of the embodiments, the torch assembly 100 further includes a fixing means 5 for attaching onto other travelling means or robotic arms. In one preferred embodiment, a cooling water tube 3 and an associate cooling chamber 9 are also built into the torch assembly 100, cooling the torch or gun in high heat operations, if necessary. The cooling chamber 9 can be disposed between the detachable shielding gas nozzle 10 and the torch body 8, as best shown in FIG. 2.

Prior to operation, power machines should be directly connected to the torch assembly through connecting the power cable to connector 4, wire feed units can be connected to the wire conduits 1 through wire cables. In addition, shielding gas can be introduced to the torch through the gas tube 2, and cooling water to the water tube 3. During operation, each wire can be independently controlled by the connected power machine and wire feed unit.

For each electrode wire, there is provided the wire conduit 1, the shielding gas tube 2, the optional cooling water tube 3, and the contact tip 12. Within the torch assembly 100, at least in the torch body 8 and the contact tip 12, the two wires are arranged to be parallel with each other. The double wire torch assembly 100 further comprises a wire conduit spacing filler 6 and a wire spacing adjusting mechanism 7, described as below.

It will be appreciated by those skilled in the art that these two wires can adopt the same parameters, such as same wire size, same wire feed speed, same power supply, and/or same shielding gas flow rate. The different parameters or settings can also be used for the two wires in another weld condition, as required. In one preferred embodiment, the first wire electrode is referred to as the "lead electrode" and the second as the "trail electrode", and the lead electrode generates most of the base metal root penetration, while the trail wire controls the weld pool for bead contour and edge wetting, thereby adding to the overall deposition rate. In another preferred embodiment, the trail electrode wire has a smaller size than the lead electrode wire.

As best shown by FIG. 1, the wire conduit 1 is preferably formed with quick connection fittings to be connected with the wire cable. Such fittings are configured to allow a wrench grip to facilitate the connection/disconnection of the wire cable. Likewise, quick connectors can be applied to the connections for the shielding gas tubes and/or the cooling water tubes, which allow for a very convenient tube connection and disconnection for torch cleaning, maintenance and repair. Such connectors are known and any conventional connectors can be employed which allow for the quick connection feature.

Figure 3:
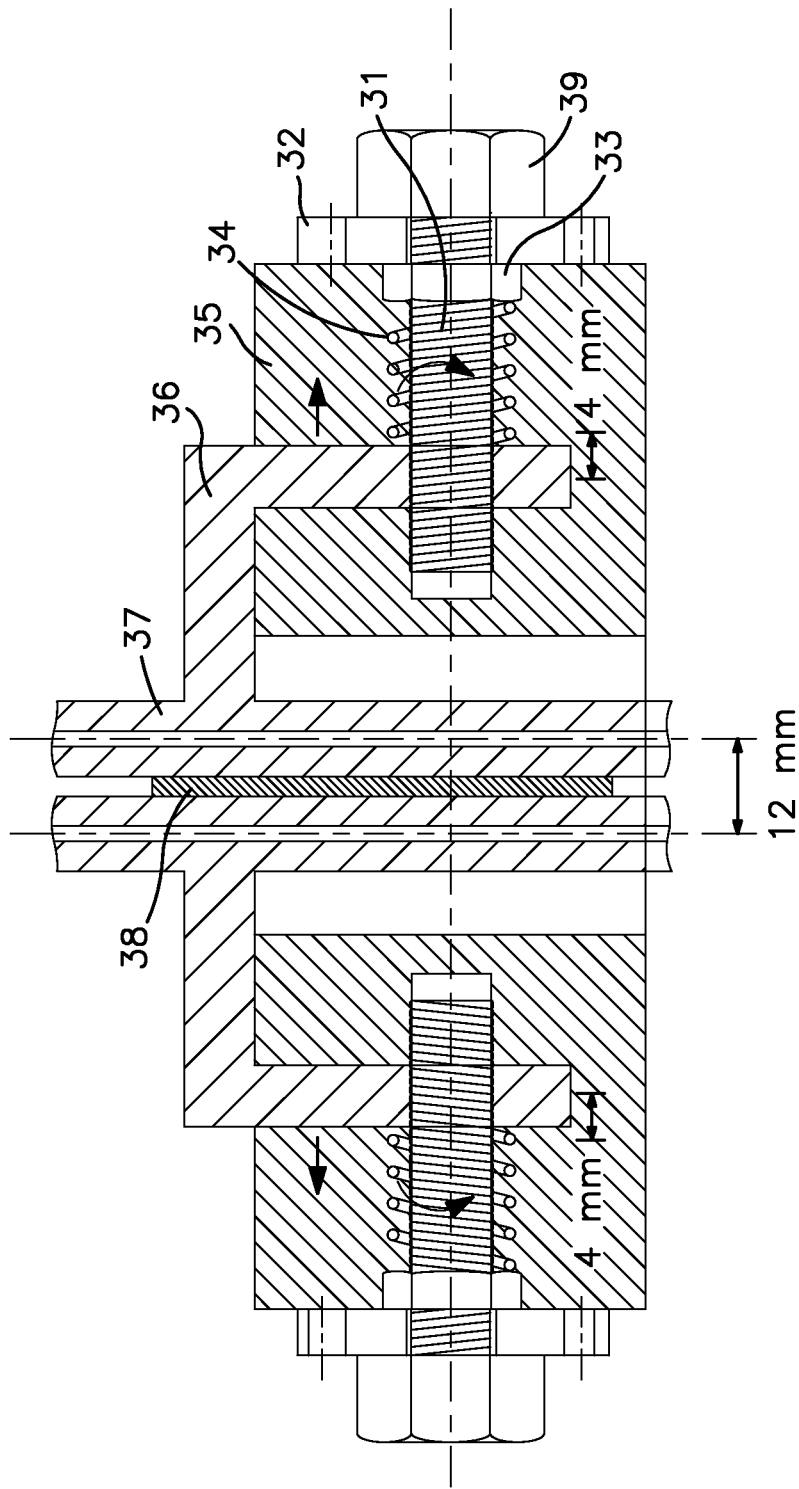
FIG. 3 is a schematic view of the wire spacing adjusting mechanism for the torch assembly in accordance with the present invention.

Next referring to FIG. 3 and also FIGS. 1-2, the wire spacing adjusting mechanism of the double wire GMAW welding apparatus according to the present invention is illustrated. In this embodiment, the two wires are disposed to be parallel to each other, and the wire spacing which is referred to the inter-wire distance between the two electrode wires is adjusted in an inter-wire parallel relationship as described below in detail.

The torch main body 35 is provided with a thread shaft 31, which transversely extend through the torch main body 35. Specifically, the thread shaft 31 is fit in the threaded hole of the torch main body 35, and in thread engagement with and thus movable with relation to the torch main body 35. A movable block 36 is disposed on the thread shaft 31 in thread engagement therewith. With the rotation of the thread shaft 31, the movable block 36 is able to move backwards and forwards on the thread shaft 31 along the direction thereof and thus move with respect to the torch main body 35. A wire conduit 37 is coupled with the movable block 36 or integrated with it as a whole by any suitable technical means for those skilled, therefore the wire conduit can move with the movable block 36 when the thread shaft 31 is rotated. Such means for connecting the wire conduit 37 and the movable block 36 include, but not limited to, bolting, welding, riveting, or molded together. With such an arrangement, one wire conduit can be moved in a parallel manner with relation to the other wire conduit by rotating the thread shaft. According to one preferred embodiment, the thread shaft 31 is provided with a nut or knob 39, in order to easily change the distance between two wire conduits by turning such a nut or knob 39 either manually and/or by the use of suitable tools. In a further preferred embodiment, each wire conduit is provided with such an arrangement, thereby allowing each wire conduit to be moved with respect to each other and the wire spacing can be easily adjusted by means of the nuts or knobs 39 located on both sides of the torch main body 35, as shown in FIG. 3, allowing an in situ adjustment of the wire spacing without removing or disassembling any component of the torch.

Preferably, a plate 32, which is positioned between the nut 39 and the torch main body 35, is fixed onto the torch main body 35 by screws or any other suitable connection. A spring 34 is configured to be around the thread shaft 31, with one end abutting against the movable block 36 and the other end abutting against the plate 32, acting as a buffer for the smooth movement during the change of the wire spacing. It will be appreciated by those skilled in the art that other suitable known buffer devices can also be used in place of spring 34, as desired.

The wire spacing adjusting mechanism is preferably provided with an insulating filler 38 tightly fit between the two wire conduits 37, thereby preventing any contaminant and/or air from entering into the torch assembly from outside when the torch operates and during the wire spacing adjustments. The insulating filler can be made of any suitable insulator materials known to those skilled in the art for keeping these two wire conduits electrically insulated from each other at any position along the conduit and at any point during the wire spacing adjustment. The insulating filler 38 can be configured in a form of a plate, and one or more such plates with same or different thickness can be inserted into the gap between the two wire conduits 37.

In one embodiment, as shown in FIG. 3, the movable block 36 and one of the wire conduits 37 are able to move along the length of the thread shaft 31 relative to the torch main body 35. The other wire conduit 37 has the same mobility relative to the torch main body 35. In one of the exemplary embodiments, the initial distance between the two wire conduits is set as 12 mm. And each wire conduits can be moved 0 to 4 mm. If both wire conduits are moved farthest away from each other, the inter-wire distance is changed to 20 mm. In this way, the wire spacing adjusting mechanism provides a continuously adjustable wire spacing range between 12-20 mm. Of course, other adjustable ranges are also adoptable with reference to a variety of initial distance set values and mobility ranges.

It will be appreciated by those skilled in the art that the wire spacing can be adjusted to a predetermined distance value according to different GMAW conditions or applications. Such continuous wire spacing adjustment makes the torch assembly of the present invention suitable for a wide variety of GMAW conditions including the non-synchronized welding, as described below.

In another preferred embodiment, the insulating filler further comprises expandable materials, spring elements, or any other suitable device for filling the whole space between two wire conduits during the adjusting process, especially when the wire spacing increases to larger distances.

It should be noted that the wire spacing adjustment is achieved by the inter-wire parallel wire conduit movement. In other words, within the torch assembly these two wire conduits are always maintained in a parallel relationship with respect to each other before, during, and after the wire spacing adjustment. It is advantageous for GMAW welding because after such a wire spacing adjustment has been done, the tip-to-work distance, which is one of the essential factors for the GMAW welding, can be kept unchanged due to the parallel movement of the wire conduits. If the tip-to-work distance is changed unevenly, it is unlikely to achieve the quality of the weld desired. Through the double parallel wire arrangement, the wire spacing adjusting mechanism and its parallel adjustment according to the present invention, there is no need to realign or reposition the two wires and their respective components in situ after the wire spacing is adjusted.

It will be easily appreciated by those skilled in the art that although the present invention is described with reference to the above wire spacing adjusting mechanism employing the thread shaft, other wire spacing adjusting mechanisms can also be used provided the parallel adjustment for the wire spacing is achieved. Further, although not shown, the wire spacing adjusting mechanism can also be used for triple or more wires spacing adjustment as needed.

Moreover, for each one of wire electrodes there is separately provided at least one power supply, wire feed unit, and shield gas supply controls, at least one or all of which are independently controlled from the other. More preferably, each respective wire electrode is associated with one independently controlled power supply and wire controls, thereby monitoring and then optimizing the welding variables for each one of two wire electrodes so as to minimize the two wire arc interference.

The double wire torch assembly can also be used for a non-synchronized metal transfer weld process, with a stable arc accomplished and no spatter occurring. The double wire GMAW weld apparatus with such a torch assembly eliminates the need for an expensive synchronous control unit. Two conventional power supplies without the pulse function can also be used, which greatly reduce the investment cost of the welding system. Moreover, compared to a torch with fixed wire spacing, the present torch assembly, by means of the wire spacing adjustment, provides a changeable wire spacing torch suitable for different weld conditions requiring different inter-wire distances. A single torch constructed as above with adjustable wire spacing can replace the need for multiple torches with fixed inter-wire distances significantly saving costs for the welding operation.

Figure 4A:
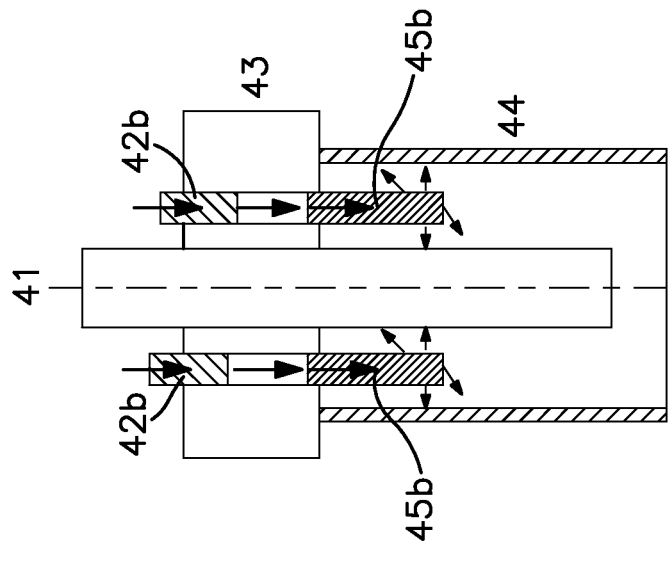
FIGS. 4a and 4b are cross-sectional views showing the flow path of the shielding gas in the torch assembly.
Figure 4B:
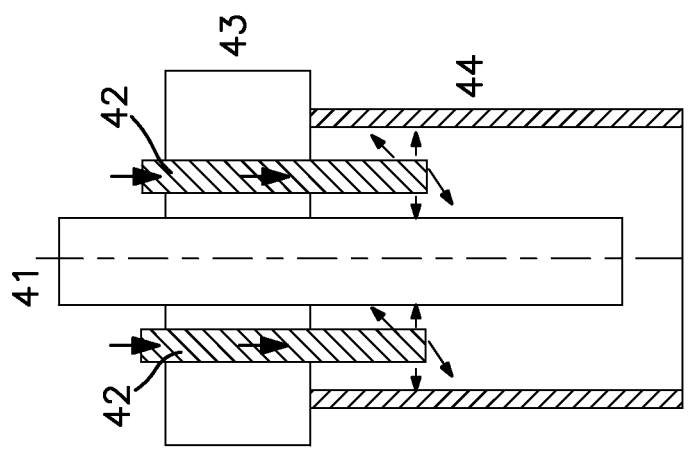

Now referring to FIGS. 4a and 4b, a shielding gas flow path in the torch assembly is illustrated. Shielding gases are necessary for gas metal arc welding to protect the welding area from atmospheric gases such as nitrogen and oxygen, which can cause fusion defects, porosity, and brittle weld metal junctions if the gases come in contact with the electrode, the arc, or the welding metal. As shown in FIG. 2, a shielding gas outlet 11 is disposed within the torch assembly.

As shown in FIG. 4a, shielding gases are introduced via the gas inlet tube 42, which are parallel to the wire conduits 41. The incoming gases flow out through the side-holes of each gas tube, subsequently filling the inner space of the nozzle 44 as indicated by arrows in FIG. 4a. Next, such shielding gases flow outwards along the two wire electrodes to the weld pool, meanwhile confined by the nozzle wall, preferably a conic nozzle wall. This design not only leads to an effective gas shielding, but also provides a very convenient way for gas introduction.

When the wire spacing is changed, especially to increase the distance between the wires, conventional shielding gas diffusers cannot always provide a consistent gas flow at such wire spacing, and hence are unable to generate an adequate gas shielding for protecting the weld pool. According to the present invention with the above described shielding gas flow design, adequate and consistent gas shielding can be achieved for a variety of wire spacing distances within the desired range. Further, when the gas diffuser is eliminated, conventional and common contact tips can be utilized even though the space requirement is limited.

Alternatively, the shielding gas tube may have two parts, i.e., a gas inlet tube 42b and a gas outlet tube 45b, as shown by FIG. 4b. With such gas tube configuration, the outlet tube can be easily attached to and removed from the torch body 43 by means of thread connection or other connection means.

In one preferred embodiment, a shielding gas containing 5%-25% $CO_2$ and/or 1% to 5% $O_2$ in argon is used. Of course, other choices of a shielding gas can be made by those skilled in the art, dependent on several factors, most importantly the type of material being welded and the metal transfer mode being used.

The double wire torch assembly and the GMAW welding apparatus using such torch assembly according to the present invention can be used for butt welding, fillet welding, or lap welding, etc. When the preferred conic nozzle is used, the torch assembly of the present invention is suitable for fillet joint welding, despite its relatively wide wire spacing.

Again referring to FIG. 2, the electrode wire diameter in the range of 0.8-1.6 mm can be applied to the first wire, while similar or smaller electrode is used for the second wire. It will be understood by those skilled in the art that, depending on the metal transfer process and base materials being used, the diameter of the electrode for the first and second wire can vary from the above range. In use, those skilled in the art can make electrode material selection, based primarily on the composition of the metal being welded, but also on the metal transfer process variation being used, the joint design, and the material surface conditions. The torch assembly of the present invention can be used not only with carbon steel solid wires, but flux-cored and/or metal cored wire as well, while the utilization of stainless steel and aluminum wire is also expected to produce positive results. Similar to single wire MIG/MAG welding, the welding variables that can be preset include welding current, voltage, wire feed speed, travel speed, tip-to-work distance, and torch angle.

Figure 5:
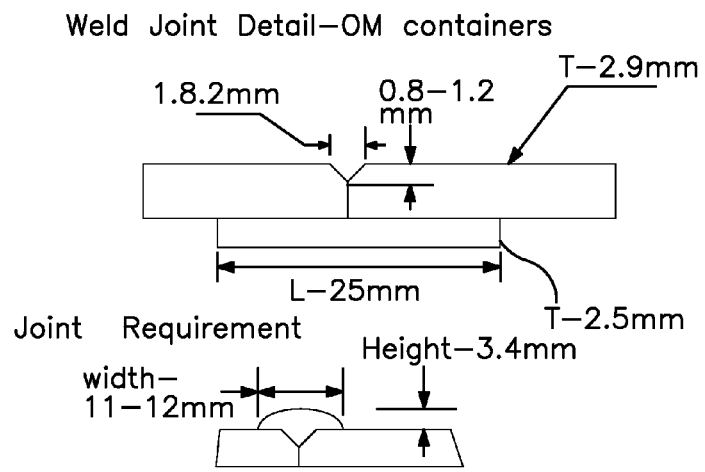
FIG. 5 shows the welding condition for the torch assembly used in an operational test.

FIG. 5 shows the welding condition for the torch assembly used in an operational test. For the lead electrode, electric current is set between 280-290 Amps and voltage of 32V is set; and for the trail electrode, electric current is set between 250-260 Amps and voltage of 30V is set. The wire interdistance was preset and measured to be 17 mm before the test. A weld joint having 1.052 m length is achieved by the double wire torch assembly with acceptable quality within 50 seconds.

Figure 6:
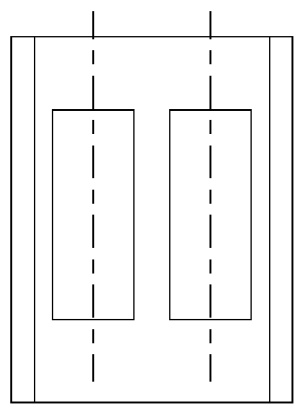
FIG. 6 is a schematic view of a round detachable nozzle for the torch assembly.
Figure 7:
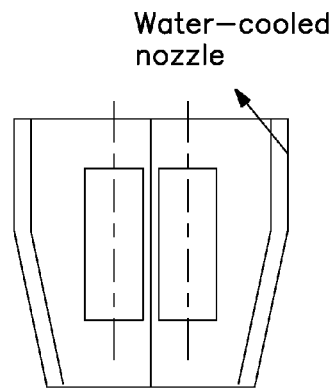
FIG. 7 is a schematic view of a detachable water-cooled nozzle for the torch assembly.

A round detachable nozzle is shown in FIG. 6, which can be used for butt or lap joint welding. For heavy duty operations, a water-cooled detachable nozzle is desired although the water chamber 9 is applied (shown in FIG. 1, FIG. 2), as shown in FIG. 7, which can avoid the potential overheat of the nozzle. Preferably, a cooling system, e.g. air cooled or water cooled heat dissipater, is positioned in the upper portion of the nozzle, and/or the lower portion of the nozzle is of conic shape and can be detached from the torch assembly. In some weld applications, a torch without cooling is also feasible. Due to the flexibility of the torch design, a wide range of welding parameters can be utilized.

Changes in construction materials of the torch body, the nozzle and the tubes can be implemented to further improve the torch robustness, weight and cost.

One or more embodiments of the present invention have been described above. Nevertheless, it will be understood by those skilled that various modifications may be made without departing from the spirit and scope of the invention. Accordingly, other embodiments are within the scope of the following claims.

The invention claimed is:

1. A GMAW welding apparatus comprising a double wire torch assembly wherein said double wire torch assembly comprises,
   two separate electrode wire conduits arranged to be parallel to each other in a torch body of the double wire torch assembly,
   two power supply connectors for connecting to two electric supplies,
   an electrode wire provided in each of said two wire conduits and positioned to be parallel to each other,
   a contact tip provided for each of said electrode wire,
   a shielding gas nozzle for directing a shielding gas from a shielding gas supply towards a weld area,
   a cooling chamber providing cooling of the nozzle and torch body, and
   a wire spacing adjusting mechanism capable of adjusting the distance between said two electrode wire conduits in an inter-wire parallel relationship, said two wire conduits being maintained in the parallel relationship with respect to each other before, during, and after the wire spacing adjusting so that the distance between the contact tip and the work pieces to be welded can be kept unchanged due to the parallel movement of said two electrode wire conduits.

2. The GMAW welding apparatus of claim 1 wherein the double wire torch assembly is used in a non-synchronized metal transfer weld process.

3. The GMAW welding apparatus of claim 1 wherein the wire spacing adjusting mechanism includes a thread shaft, which transversely extend through a torch main body and is fit within a threaded hole of said torch main body in such a way that the thread shaft is in thread engagement with and thus movable with relation to said torch main body, and further including a movable block disposed on the thread shaft in thread engagement therewith, with the rotation of the thread shaft, the movable block is able to move backwards and forwards on said thread shaft along the direction thereof and thus move with respect to said torch main body, and that the wire conduit is coupled with the movable block or integrated with it as a whole, enabling the wire conduit to move with said movable block, thereby one of said wire conduits capable of being moved in a parallel manner with relation to the other wire conduit when said thread shaft is rotated by means of the nuts or knobs located on both sides of said torch main body.

4. The GMAW welding apparatus of claim 3 wherein each one of said wire conduits is provided with the wire spacing adjusting mechanism, in order to make each one of said wire conduit capable of being moved with respect to each other.

5. The GMAW welding apparatus of claim 4, wherein said double wire torch assembly further includes a plate, which is positioned between the nut and the torch main body, and is fixed onto said torch main body, and that a spring is configured to be around said thread shaft, with one end of said spring abutting against the movable block and the other end abutting against the plate, acting as a buffer for the smooth movement during the adjusting of the wire spacing.

6. The GMAW welding apparatus of claim 1, wherein said double wire torch assembly is further provided with an insulating filler, which is tightly fit between said two wire conduits, thereby preventing any contaminant and/or air from entering into the torch assembly from outside when the torch operates and during the wire spacing adjusting and keeping said two wire conduits electrically insulated from each other at any position along said wire conduit and at any point during the wire spacing adjusting.

7. The GMAW welding apparatus of claim 6 wherein the initial distance between said two wire conduits of the double wire torch assembly is set as 12 mm, and each one of said wire conduits move to provide a continuously adjustable inter-wire spacing range between 12-20 mm.

8. The GMAW welding apparatus of claim 6 wherein said insulating filler is configured in a form of a plate, and that one or more said plates with same or different thickness are inserted into the gap between said two wire conduits.

9. The GMAW welding apparatus of claim 1 wherein for each one of said wire electrodes there is separately provided one power supply and one wire feed unit, which are independently controlled from those for the other wire.

10. The GMAW welding apparatus of claim 1 a shielding gas is introduced via a gas inlet tube and that the incoming shielding gas flows out through the side-holes of said gas tube to fill the inner space of the shielding gas nozzle and flow outwards along said two wire electrodes to the weld area, confined by a conic wall of the nozzle.

11. The GMAW welding apparatus of claim 1 wherein said shielding gas nozzle is a water-cooled detachable nozzle.

12. The GMAW welding apparatus of claim 1 wherein the diameter of the first wire of said two electrode wires is 0.8-1.6 mm, while the second wire has a similar or smaller electrode size.

13. A GMAW welding apparatus which comprises a double wire torch assembly, said assembly comprising, two separate electrode wire conduits arranged to be parallel to each other in a torch body of the double wire torch assembly, two power supply connectors for connecting to two electric supplies, an electrode wire provided in each of said two wire conduits and positioned to be parallel to each other with a spacing range of between 12-20 mm, a contact tip provided for each of said electrode wire, a shielding gas nozzle for directing a shielding gas from a shielding gas supply towards a weld area, a cooling chamber providing cooling of the nozzle and torch body, and at least one wire spacing adjusting mechanism for adjusting the distance between said two electrode wire conduits and for maintaining said wire conduits parallel relationship with respect to each other during said adjusting.

* * * * *